(12) United States Patent
Minegishi et al.

(10) Patent No.: US 10,179,528 B2
(45) Date of Patent: Jan. 15, 2019

(54) VEHICLE SEAT

(71) Applicants: TACHI-S CO., LTD., Akishima-shi, Tokyo (JP); HONDA MOTOR CO., LTD., Minato-ku, Tokyo (JP)

(72) Inventors: Motoshi Minegishi, Tokyo (JP); Hirofumi Fuwa, Saitama (JP); Ryosuke Nakashima, Saitama (JP)

(73) Assignees: TACHI-S CO., LTD., Tokyo (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/653,484

(22) Filed: Jul. 18, 2017

(65) Prior Publication Data

US 2018/0029512 A1    Feb. 1, 2018

(30) Foreign Application Priority Data

Aug. 1, 2016 (JP) .................................. 2016-151316

(51) Int. Cl.
| | |
|---|---|
| *B60N 2/68* | (2006.01) |
| *B60N 2/58* | (2006.01) |
| *B60R 22/26* | (2006.01) |
| *B60N 2/60* | (2006.01) |
| *B60N 2/22* | (2006.01) |
| *B60R 22/18* | (2006.01) |
| *B60N 2/16* | (2006.01) |
| *B60N 2/20* | (2006.01) |

(52) U.S. Cl.
CPC ............... *B60N 2/688* (2013.01); *B60N 2/22* (2013.01); *B60N 2/58* (2013.01); *B60N 2/6009* (2013.01); *B60R 22/18* (2013.01); *B60R 22/26* (2013.01); *B60N 2/16* (2013.01); *B60N 2/20* (2013.01); *B60R 2022/1818* (2013.01); *B60R 2022/263* (2013.01)

(58) Field of Classification Search
CPC ...................................................... B60N 2/688
USPC ........................................................ 297/463.1
See application file for complete search history.

(56) References Cited

U.S. PATENT DOCUMENTS

| | | | |
|---|---|---|---|
| 7,938,490 B2 * | 5/2011 | Ishijima ............... | B60N 2/0296 297/463.1 |
| 7,959,229 B2 * | 6/2011 | Ishijima ............... | B60N 2/0296 297/463.1 |
| 8,353,561 B2 * | 1/2013 | Yamazaki ............... | B60N 2/44 297/463.1 |

(Continued)

FOREIGN PATENT DOCUMENTS

| | | |
|---|---|---|
| JP | S61-5239 U | 1/1986 |
| JP | 2015-209076 A | 11/2015 |

*Primary Examiner* — Anthony D Barfield
(74) *Attorney, Agent, or Firm* — Shapiro, Gabor and Rosenberger, PLLC

(57) ABSTRACT

A vehicle seat includes: a seat cushion; a seat back; a side cover provided at a side of the seat cushion and having a recess and a protrusion; a first operation lever provided in the recess; and a second operation lever provided in the recess between the first operation lever and the seat cushion. The protrusion is positioned behind the first operation lever and is disposed such that when a seat belt is fastened, the webbing of the seat belt is abutted against the protrusion. The rear side face of the first operation lever is positioned inside a side face of the protrusion and the rear upper face of the first operation lever is positioned below the upper face of the protrusion.

5 Claims, 6 Drawing Sheets

(56) References Cited

U.S. PATENT DOCUMENTS 9,022,477 B2 * 5/2015 Pleskot .................... B60N 2/06
 297/463.1
2012/0313408 A1 * 12/2012 Nagata ................. B60N 2/4235
 297/463.1 X

* cited by examiner

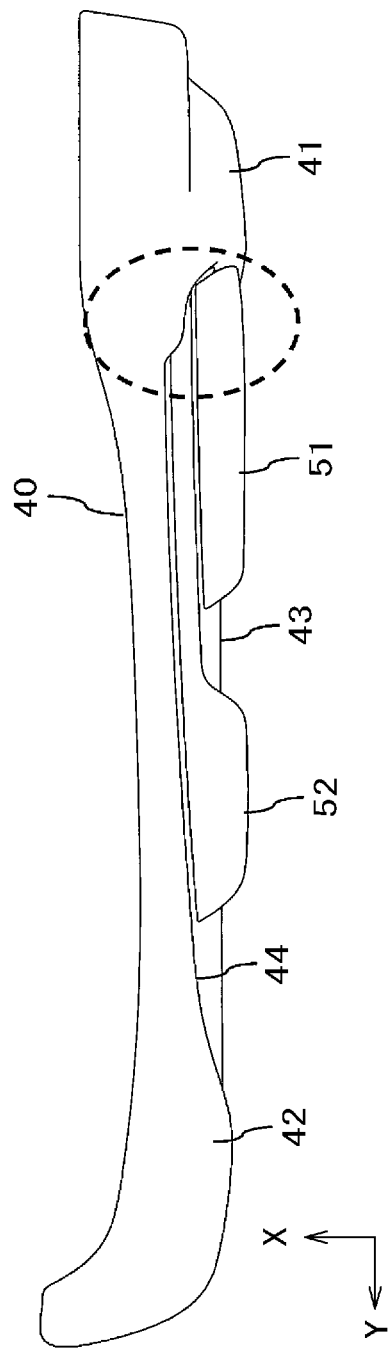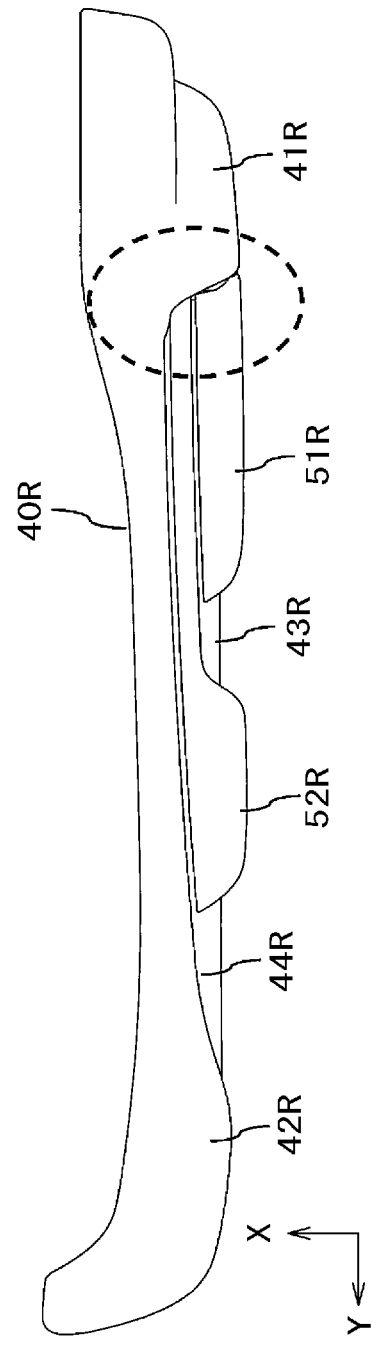

FIG.5A
FIG.5B
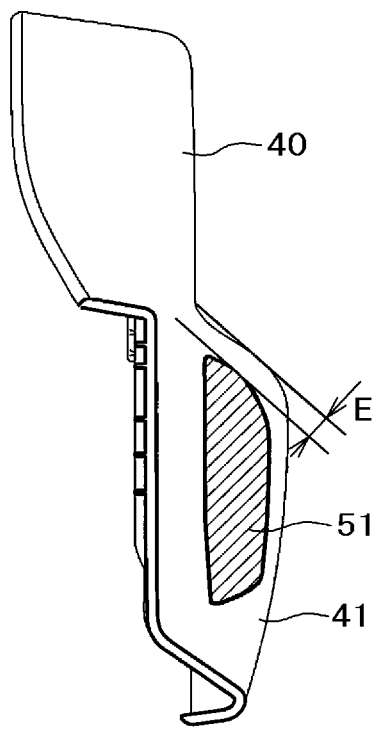
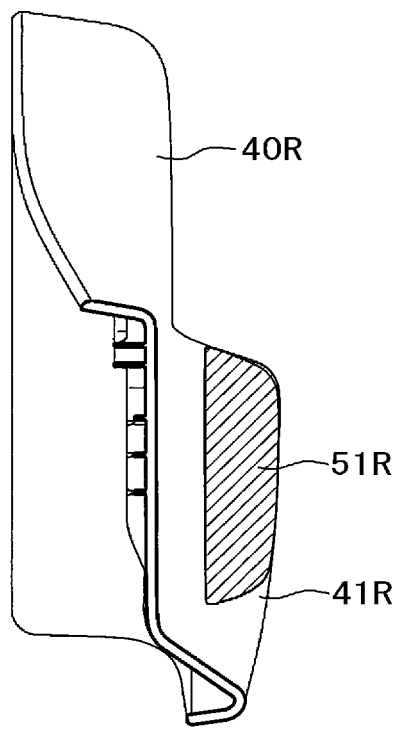

VEHICLE SEAT

CLAIM OF PRIORITY

The present application claims priority from Japanese patent application JP2016-151316 filed on Aug. 1, 2016, the content of which is hereby incorporated by reference into this application.

BACKGROUND

The present disclosure relates to a vehicle seat and is applicable to, for example, a vehicle seat equipped with a reclining operation lever.

Seat belts are provided for protecting occupants and a large load may be applied to a seat belt when an occupant meets with a frontal collision or on other like occasions. A load applied to a seat belt is produced by an occupant being moved relative to the vehicle seat. More specifically, when an occupant is moved away from a vehicle seat, a load is applied to the seat belt.

Seat belts basically have a function of detecting acceleration applied to the relevant vehicle in heavy braking or a frontal collision and locking a belt. A seat belt is provided with: a pretensioner that instantaneously draws in a belt in a collision and thereby enhances occupant protecting performance; a load limiting device that absorbs and mitigates a load applied to an occupant from a belt when the occupant is moved forward by inertia; and the like.

SUMMARY

A certain gap must be provided between two components for a structural reason but a seat belt can fall into the gap in a frontal collision or ordinary use. When a face of a first component against which a seat belt is abutted is lower than (inside) a face of a second component located in the direction of movement of a seat belt, the seat belt is prone to fall into a gap (recess) between the first component and the second component. In Japanese Patent Application Laid-Open No. 2015-209076, the first component is a reclining lever (62) and the second component is a lifter lever (61). In Japanese Utility Model Application Laid-Open No. 61-5239, the first component is a seat adjust lever (7) and the second component is a front part of a finisher (3). In either case, a face of the first component is lower than (positioned inside) a face of the second component.

It is an object of the present disclosure to provide a vehicle seat configured to suppress a seat belt from falling into a gap.

Other objects and novel features of the present disclosure will be apparent from the following description in this specification and the accompanying drawings.

Representative configuration elements of the present disclosure are simply described as follows:

The vehicle seat is configured such that a face of a first component against which a seat belt is abutted is higher than (positioned outside) a second component located in the direction of movement of the seat belt.

According to the above-mentioned vehicle seat, the seat belt can be suppressed from falling into a gap.

BRIEF DESCRIPTION OF THE DRAWINGS

FIG. 3A is a top view of a side cover in the embodiment;

FIG. 3B is a top view of a side cover in the comparative example;

FIG. 5A is a front view of a part of a side cover in the embodiment;

FIG. 5B is a front view of a part of a side cover in the comparative example;

DESCRIPTION OF THE PREFERRED EMBODIMENTS

Figure 1:
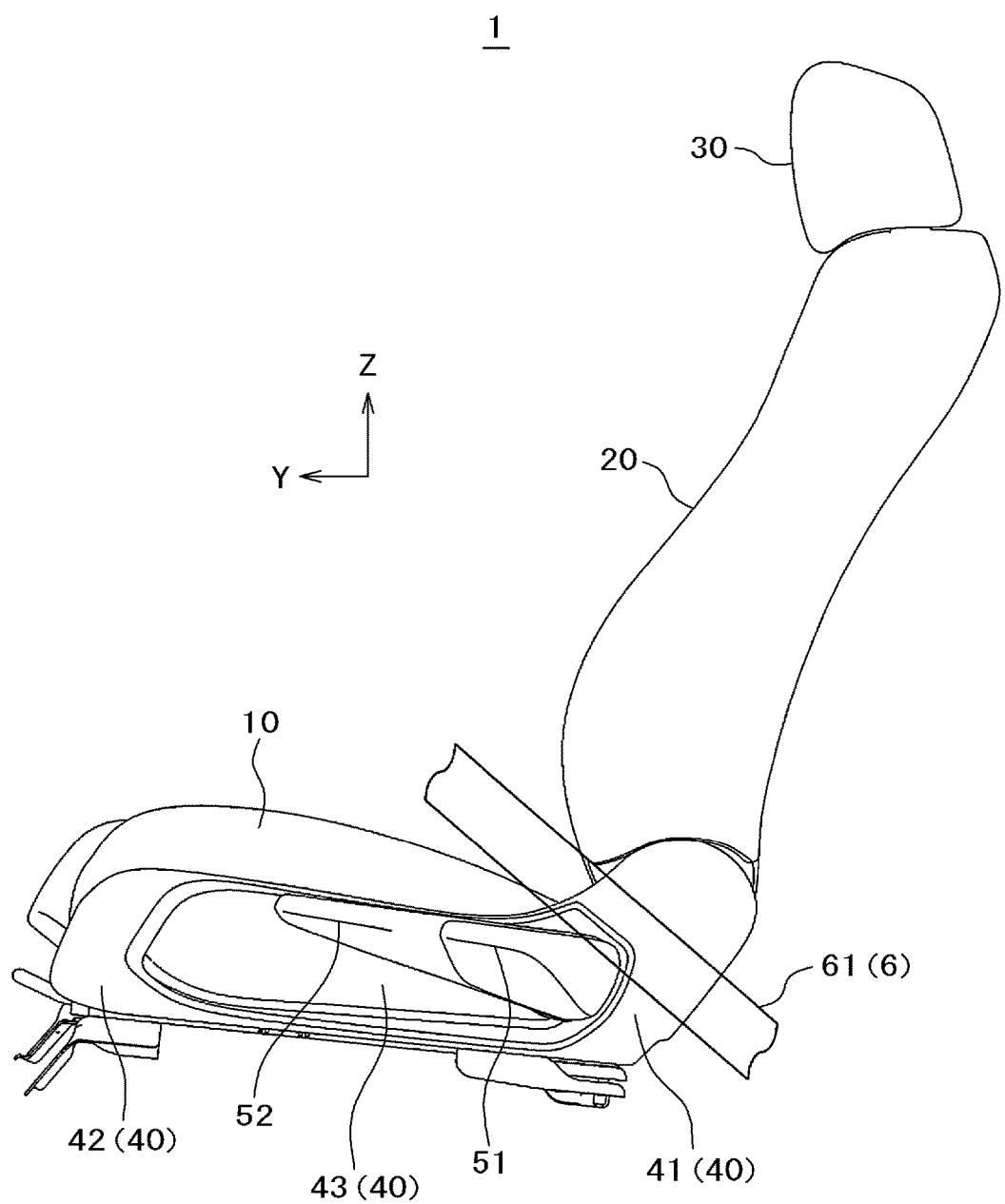
FIG. 1 is a side view illustrating a vehicle seat in an embodiment.

Hereafter, a description will be given to an embodiment and a comparative example with reference to the drawings. In the following description, identical components will be marked with identical reference numerals and a repetitive description of these components may be omitted. For the purpose of clarification of the description, some of the drawings may schematically depict the width, thickness, shape, and the like of each part as compared with actual embodiments; however, such drawings are just for example and are not intended to limit the interpretation of the present invention. The directions, such as front-back direction, vertical direction, and crosswise direction, found in this specification are defined as follows: The Y-axis positive direction shown in FIG. 1 is the frontward direction; the X-axis positive direction is the rightward direction; and the Z-axis positive direction is the upward direction. The comparative example is a technology the present inventors considered prior to the present invention and the embodiment will be described based on comparison with the comparative example.

Embodiment

Figure 2:
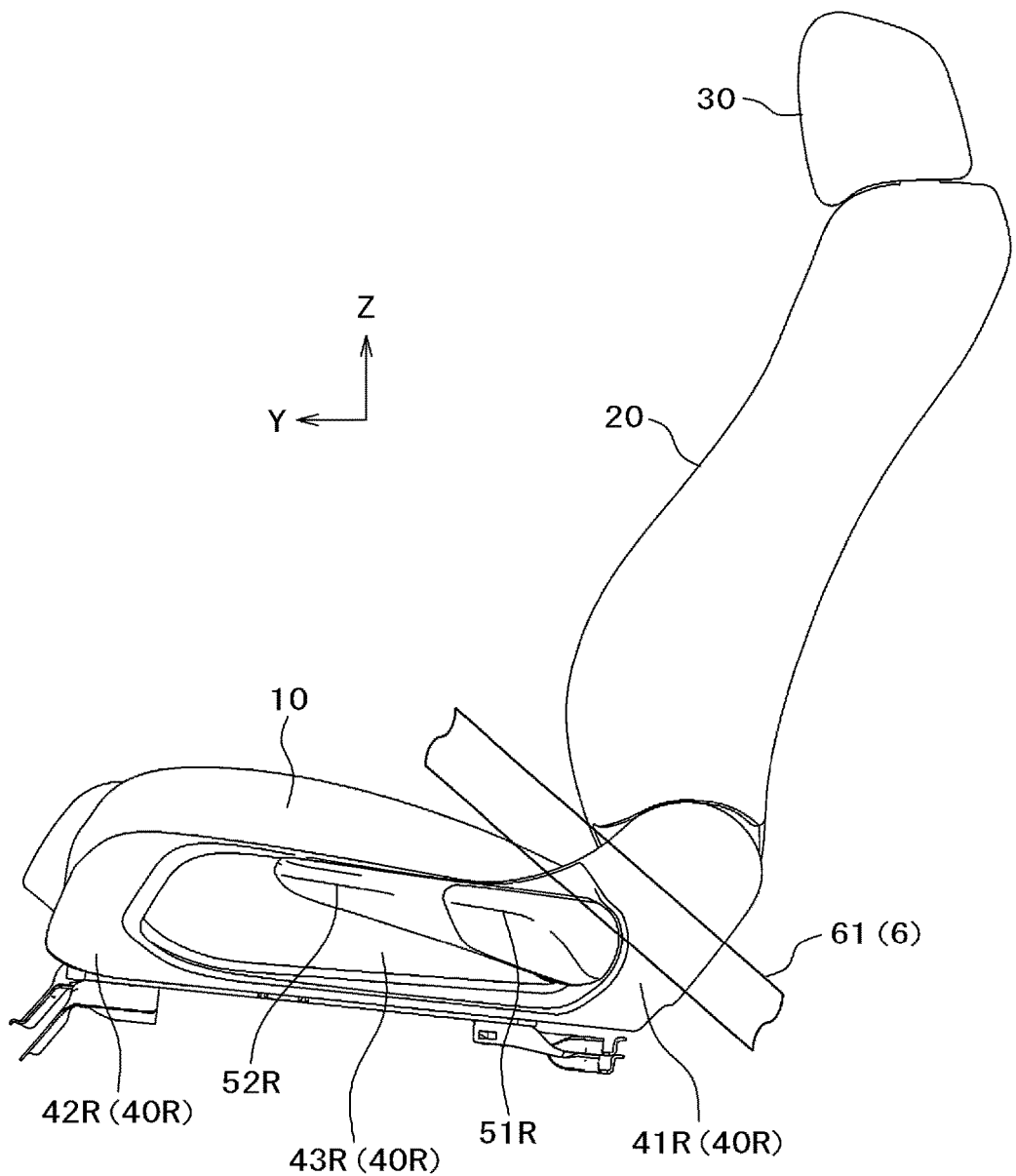
FIG. 2 is a side view illustrating a vehicle seat in a comparative example.

First, a description will be given to the structures of a vehicle seat in the embodiment and a vehicle seat in the comparative example with reference to FIGS. 1 to 3A and 3B. FIG. 1 is a side view illustrating the vehicle seat in the embodiment. FIG. 2 is a side view illustrating the vehicle seat in the comparative example. FIG. 3A is a top view of the side cover portion in FIG. 1; and FIG. 3B is a top view of the side cover portion in FIG. 2.

The vehicle seat 1 in the embodiment includes an elevatable seat cushion 10, a seat back 20 tiltable relative to the seat cushion 10, a headrest 30 joined to the seat back 20, and a side cover 40.

The side cover 40 covers a side face of a rear part of the seat cushion 10 from a side of a front part of the seat cushion 10 and further covers a side face of a lower part of the seat back 20 from a side of the seat back 20. In addition, a reclining mechanism and a lifter mechanism, neither of which is shown in the drawing, are also covered with the side cover 40. The side cover 40 is a resin molding. The side cover 40 has protrusions 41, 42, 43 protruded laterally (outward), respectively located at the rear part, the front part, and the lower part of the side cover and a recess 44 recessed inward, located between these parts.

The side cover 40 is provided in the recess 44 with a first operation lever 51 and a second operation lever 52 that can be gripped by an operator. The first operation lever 51 and the second operation lever 52 are formed of resin. More specifically, the first operation lever 51 is a reclining operation lever used to adjust a tilt of the seat back 20; and the second operation lever 52 is a lifter operation lever used to adjust a height of the seat cushion 10. The first operation lever 51 is coupled to the reclining mechanism attached to a frame; and the second operation lever 52 is coupled to the lifter mechanism attached to the frame. The first operation lever 51 is shorter than the second operation lever 52 and the first operation lever 51 placed outside the second operation lever 52. As a result, a holding portion of the first operation lever 51 and a holding portion of the second operation lever 52 are arranged such that the holding portions are aligned in the front-back direction; and the holding portion of the first operation lever 51 is positioned behind the holding portion of the second operation lever 52.

A vehicle equipped with a vehicle seat in this embodiment is provided with a seat belt 6. The seat belt 6 is provided with: fabric-like webbing 61; a tongue (not shown) as a latch; a retractor (not shown) acting to take up the webbing 61 into a predetermined state; a webbing securing portion (not shown) securing the webbing 61; and a buckle (not shown) into which the tongue can be inserted and secured.

On the side where the first operation lever 51 and the second operation lever 52 are placed (left side in FIG. 1), the webbing securing portion securing the webbing 61 is provided below a supporting face of the seat cushion 10. When a seated occupant wears the seat belt (in ordinary use), the movement of the region in proximity to the waist of the seated occupant can be suppressed by the webbing 61 laid between the buckle and the webbing securing portion.

In ordinary use, a part of the webbing 61 is positioned outside the protrusion 41 on the rear side of the side cover 40 (X-axis negative direction side) in proximity to the height of the first operation lever 51; and a different part of the webbing is positioned outside the first operation lever 51 such that the different part is abutted against (positioned in) the vicinity of the rear part of the first operation lever 51. When a frontal collision occurs, the webbing 61 is moved slightly backward by the pretensioner. After the webbing is entirely positioned outside the protrusion 14 on the rear side of the side cover 40, the webbing is moved slightly frontward by a load applied by the seated occupant and can be moved to the front part side of the first operation lever 51. At this time, since the seated occupant is seated in proximity to the center of the vehicle seat 1, the load is applied to the webbing 61 such that the webbing is pulled in proximity to the center of the vehicle seat 1. For this reason, the webbing 61 is about to move obliquely frontward in proximity to the first operation lever 51 provided on a side of the vehicle seat 1. The part of the webbing 61 positioned behind the first operation lever 51 is about to move frontward and toward the center of the vehicle seat 1 and is thereby moved to adjoin the first operation lever 51. The front end of the webbing 61 is never moved ahead of the front end of the first operation lever 51.

The vehicle seat 1R in the comparative example is identical with that in the embodiment except the shapes of the side cover 40R and the first operation lever 51R encircled with a broken line in FIG. 3B.

A certain gap must be provided between the side cover 40 and the first operation lever 51 (between the side cover 40R and the first operation lever 51R) for a structural reason. It was found from an experiment of a frontal collision that in the comparative example, the seat belt 6 could fall into the gap and a load could get into a direction in which the first operation lever 51R drops off.

Figure 4A:
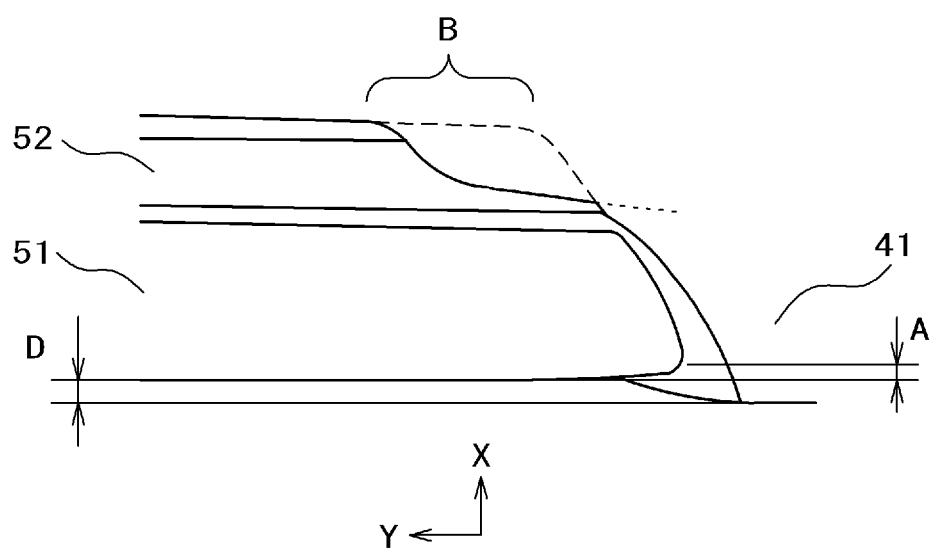
FIG. 4A is a top view of the vicinity of a first operation lever in the embodiment.
Figure 4B:
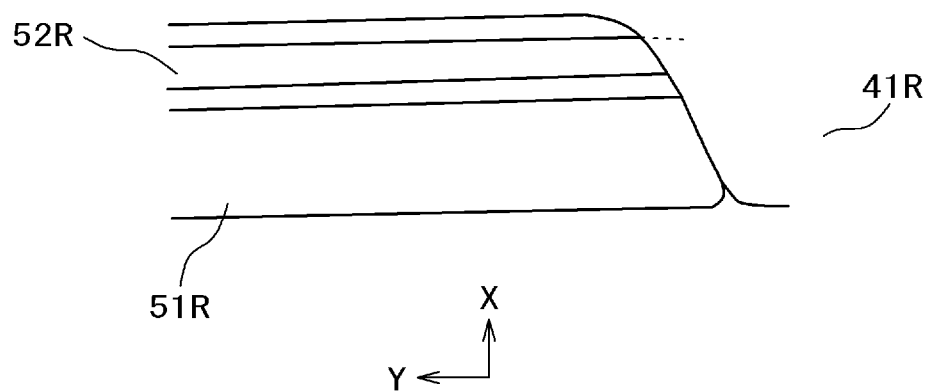
FIG. 4B is a top view of the vicinity of a first operation lever in the comparative example.
Figure 6A:
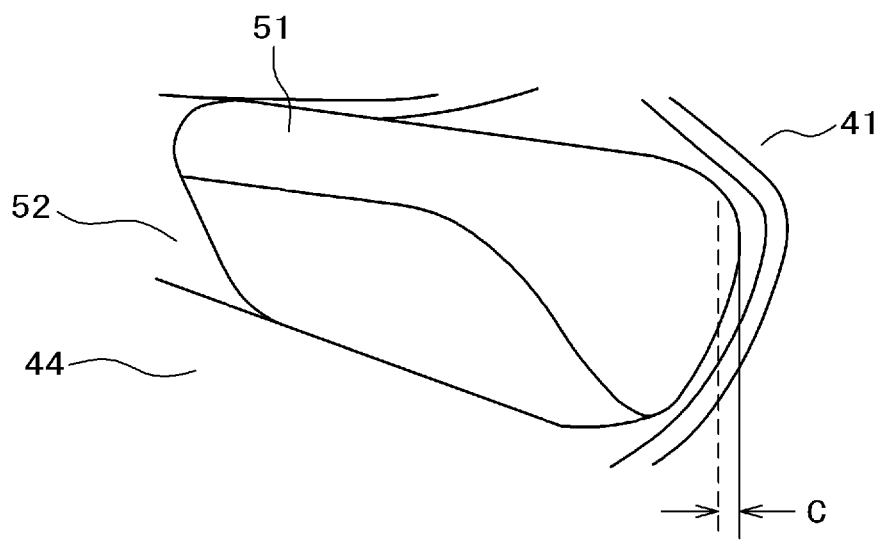
FIG. 6A is a perspective view of the vicinity of a first operation lever in the embodiment as viewed laterally.
Figure 6B:
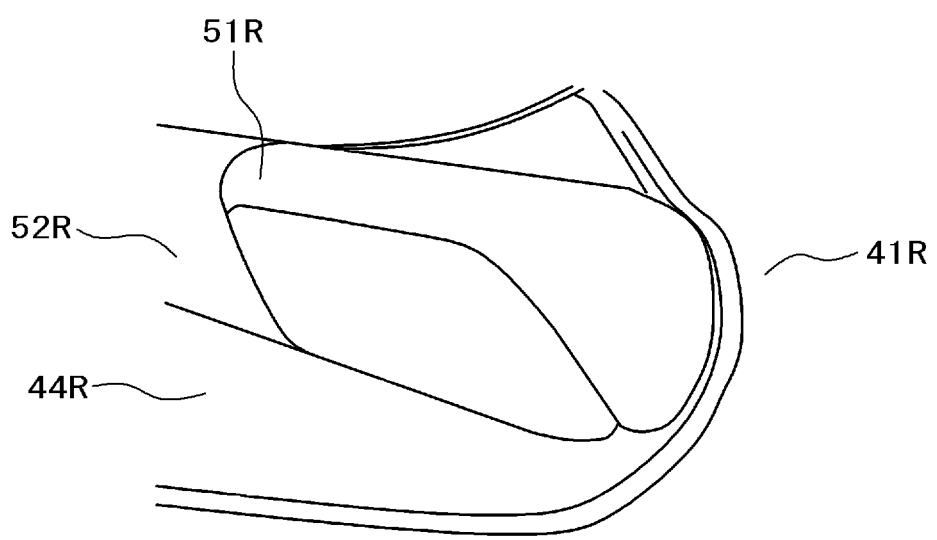
FIG. 6B is a perspective view of the vicinity of a first operation lever in the comparative example as viewed laterally.

A description will be given to the first operation lever with reference to FIGS. 4A, 4B, 5A, 5B, 6A, and 6B. FIG. 4A is a top view of the vicinity of the first operation lever in the embodiment; and FIG. 4B is a top view of the vicinity of the first operation lever in the comparative example. FIG. 5A is a front view of the embodiment as viewed from the border between the protrusion on the rear side of the side cover and the first operation lever; and FIG. 5B is a front view of the comparative example as viewed from the border between the protrusion on the rear side of the side cover and the first operation lever. FIG. 6A is a perspective view of the vicinity of the first operation lever in the embodiment as viewed laterally; and FIG. 6B is a perspective view of the vicinity of the first operation lever in the comparative example as viewed laterally.

In the embodiment, as indicated by "D" in FIG. 4A, a side face of the protrusion 41 of the side cover (recliner cover) 40 is made wider than the first operation lever (reclining operation lever) 51 in the direction of width. Provision of a step between an end portion of the first operation lever 51 and an end portion of the protrusion 41 in the side face direction brings about advantages. The front end portion of the webbing 61 of the seat belt 6 is made less prone to be caught by an end portion of the first operation lever 51 and the webbing 61 is made less prone to fall into the gap between the first operation lever 51 and the protrusion 41. In the comparative example, meanwhile, as shown in FIG. 4B, a side face of the protrusion 41R of the side cover 40R is flush with that of the first operation lever 51R in the direction of width.

In the embodiment, as indicated by "A" in FIG. 4A, the rear end portion of the first operation lever 51 is narrowed in proximity to the border of the protrusion 41 of the side cover 40 in the direction of width. As a result, the step between an end portion of the first operation lever 51 and an end portion of the protrusion 41 can be made larger in the side face direction. In the comparative example, meanwhile, as shown in the FIG. 4B, the rear end portion of the first operation lever 51R is unchanged in dimension in proximity to the border of the protrusion 41R of the side cover 40R in the direction of width.

In the embodiment, as indicated by "E" in FIG. 5A, the upper part of the rear end portion of the first operation lever 51 is narrowed in proximity to the border of the protrusion 41 of the side cover 40 in the direction of width. Provision of a step between an end portion of the first operation lever 51 and an end portion of the protrusion 41 on the upper face side brings about advantages. The front end portion of the webbing 61 of the seat belt 6 is made less prone to be caught by an end portion of the first operation lever 51 and the webbing 61 is made less prone to fall into the gap between the first operation lever 51 and the protrusion 41. In the comparative example, meanwhile, as shown in FIG. 5B, the upper part of the rear end portion of the first operation lever 51R is unchanged in dimension in proximity to the border of the protrusion 41R of the cover 40R in the direction of width.

In the embodiment, as indicated by "C" in FIG. 6A, the rear end of the upper part of the first operation lever 51 is extended and brought closer to the webbing 61 of the seat belt. As a result, a portion of the first operation lever 51 extended in the same direction as the direction of extension of the front end portion of the webbing 61 can be reduced. Consequently, the webbing 61 is made less prone to fall into the gap between the first operation lever 51 and the protrusion 41. In the comparative example, meanwhile, as shown in FIG. 6B, the rear end of the upper part of the first operation lever 51R is positioned ahead of that in the embodiment. In FIG. 6A, the solid line indicated by "C" indicates the position of the rear end of the upper part of the first operation lever in the embodiment and the broken line indicates the position of the rear end of the upper part of the first operation lever in the comparative example.

In the embodiment, as indicated by "B" in FIG. 4A, the position of the step between the side cover 40 and the second operation lever 52 is made different from the position of the gap between the first operation lever 51 and the side cover 40. The step between the side cover 40 and the second operation lever 52 is positioned ahead of the gap between the first operation lever 51 and the side cover 40. In the comparative example, meanwhile, as shown in FIG. 4B, the step between the side cover 40R and the second operation lever 52R is positioned in the direction of extension of the gap between the first operation lever 51R and the side cover 40R. The broken line in FIG. 4B indicates the position of the step between the side cover 40R and the second operation lever 52R in the comparative example.

In the embodiment, a face of the first component (a protrusion of the side cover) against which the seat belt is abutted is higher (positioned outside) a face of the second component (first operation lever) located in the direction of movement of the seat belt. This brings about advantages. After the webbing of the seat belt is pulled rearward by the pretensioner, the webbing of the seat belt is moved by the seated occupant being moved forward by inertia. Even in this case, the webbing can be prevented from getting into between the side cover and the first operation lever. Further, a possibility that a load gets into the direction in which the reclining operation lever drops off is eliminated and safety can be enhanced. In addition, damage to the webbing of the seat belt can be prevented. If the front end portion of the webbing of the seat belt is also positioned at the protrusion of the side cover behind the first operation lever in ordinary use, the same effect is obtained.

Up to this point, a concrete description has been given to the invention made by the present inventors based on the embodiment. However, the present invention is not limited to the above-mentioned embodiment and may be variously modified, needless to add.

For example, in the embodiment, the side cover, the first operation lever, and the second operation lever are provided on the left of the seat cushion. Instead, the side cover, the first operation lever, and the second operation lever may be provided on the right of the seat cushion.

What is claimed is:

1. A vehicle seat comprising:
   a seat cushion;
   a seat back tiltable relative to the seat cushion;
   a side cover provided at a side of the seat cushion and having a recess and a protrusion;
   a first operation lever provided in the recess; and
   a second operation lever provided in the recess between the first operation lever and the seat cushion,
   wherein a holding portion of the first operation lever and a holding portion of the second operation lever are positioned in the recess,
   wherein the protrusion is positioned behind the holding portion of the first operation lever,
   wherein a webbing of a seat belt is arranged to abut on a side face of the protrusion when the seat belt is fastened,
   wherein the seat belt is arranged such that a front end portion of the webbing is positioned outside a portion of the first operation lever ahead of the protrusion when the seat belt is fastened, and positioned at the protrusion by a pretensioner when a frontal collision occurs,
   wherein a side face of the holding portion of the first operation lever on a rear side is positioned inwardly relative to the side face of the protrusion on which the webbing abuts, and
   wherein an upper face of the holding portion of the first operation lever on the rear side is positioned below an upper face of the protrusion.

2. The vehicle seat according to claim 1,
   wherein a width of the first operation lever in proximity to a rear end portion of the first operation lever is narrower than width of a front part of the first operation lever.

3. The vehicle seat according to claim 2,
   wherein an area where an inner upper part of the second operation lever and the webbing overlap with each other is covered with the side cover.

4. The vehicle seat according to claim 1,
   wherein the holding portion of the second operation lever is provided ahead of the holding portion of the first operation lever.

5. The vehicle seat according to claim 1,
   wherein the first operation lever is a reclining operation lever used to adjust a tilt of the seat back, and
   wherein the second operation lever is a lifter operation lever used to adjust the height of the seat cushion.

* * * * *